(12) United States Patent
Anderson et al.

(10) Patent No.: US 10,904,292 B1
(45) Date of Patent: Jan. 26, 2021

(54) SECURE DATA TRANSFER DEVICE

(71) Applicant: Amazon Technologies, Inc., Seattle, WA (US)

(72) Inventors: Christopher Michael Anderson, Lynnwood, WA (US); Hugo Gabignon, Issaquah, WA (US); Joe W. Pate, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 170 days.

(21) Appl. No.: 16/141,561

(22) Filed: Sep. 25, 2018

(51) Int. Cl.
*G06F 21/00* (2013.01)
*H04L 29/06* (2006.01)
*G06F 21/56* (2013.01)
*H04L 9/32* (2006.01)
*H04L 29/08* (2006.01)

(52) U.S. Cl.
CPC ............ *H04L 63/20* (2013.01); *G06F 21/565* (2013.01); *H04L 9/3247* (2013.01); *H04L 63/145* (2013.01); *G06F 2221/2101* (2013.01); *G06F 2221/2107* (2013.01); *H04L 67/06* (2013.01)

(58) Field of Classification Search
CPC ..... G06F 2221/2101; G06F 2221/2107; G06F 21/565; H04L 63/20; H04L 9/3247; H04L 63/145; H04L 67/06
See application file for complete search history.

(56) References Cited

U.S. PATENT DOCUMENTS

| | | | | |
|---|---|---|---|---|
| 7,010,807 | B1* | 3/2006 | Yanovsky | G06F 21/567 726/1 |
| 7,913,004 | B2* | 3/2011 | Pomerantz | G06F 13/38 360/69 |
| 8,448,218 | B2* | 5/2013 | Bori | G06F 21/51 726/1 |
| 8,984,296 | B1* | 3/2015 | Young | G06F 9/4411 713/176 |
| 8,984,582 | B2* | 3/2015 | Ruppin | G06F 21/128 726/1 |
| 9,154,520 | B1* | 10/2015 | Cooley | H04L 63/1441 |
| 9,762,614 | B2* | 9/2017 | Ely | H04L 63/20 |
| 10,417,400 | B2* | 9/2019 | Touboul | G06F 21/554 |
| 10,469,533 | B2* | 11/2019 | Ylonen | H04L 63/16 |
| 2002/0169971 | A1* | 11/2002 | Asano | H04L 9/3273 713/193 |
| 2003/0187619 | A1* | 10/2003 | Lee | H04L 63/083 702/188 |
| 2004/0123150 | A1* | 6/2004 | Wright | G06F 21/32 726/1 |

(Continued)

*Primary Examiner* — Don G Zhao
(74) *Attorney, Agent, or Firm* — Thomas | Horstemeyer, LLP

(57) ABSTRACT

Disclosed are various embodiments for determining security policy compliance and data integrity verification during a data transfer operation between devices. In one embodiment, among others, a computing device is configured to receive a data transfer request for a file from a first client device, access the file associated with the first client device, determine that the file fails to comply with a security policy, and perform a remedial action for the file in response to the determination that the file fails to comply with the security policy. The remedial action causes the file to be inaccessible to a second client device.

20 Claims, 7 Drawing Sheets

(56) References Cited

U.S. PATENT DOCUMENTS

| | | | |
|---|---|---|---|
| 2004/0255147 A1* | 12/2004 | Peled | G06Q 20/206 726/7 |
| 2005/0154815 A1* | 7/2005 | Molander | G06F 3/0623 710/302 |
| 2007/0065119 A1* | 3/2007 | Pomerantz | G06F 13/38 386/231 |
| 2007/0143827 A1* | 6/2007 | Nicodemus | H04L 63/102 726/2 |
| 2007/0143851 A1* | 6/2007 | Nicodemus | H04L 63/105 726/25 |
| 2007/0198838 A1* | 8/2007 | Nonaka | H04L 9/3236 713/176 |
| 2008/0154633 A1* | 6/2008 | Ishibashi | G10K 15/04 705/59 |
| 2008/0235514 A1* | 9/2008 | Walker | H04L 41/28 713/185 |
| 2009/0319786 A1* | 12/2009 | Viscomi | G06F 21/56 713/165 |
| 2010/0146269 A1* | 6/2010 | Baskaran | G06F 21/10 713/165 |
| 2011/0038005 A1* | 2/2011 | Ochiai | G03G 15/5075 358/1.15 |
| 2011/0191146 A1* | 8/2011 | Gupta | G06Q 10/06395 705/7.41 |
| 2012/0151231 A1* | 6/2012 | Hatta | G06F 1/266 713/320 |
| 2012/0278631 A1* | 11/2012 | Balinsky | H04L 9/0869 713/189 |
| 2013/0058477 A1* | 3/2013 | Kobayashi | G06F 21/10 380/28 |
| 2013/0104220 A1* | 4/2013 | Lee | G06F 21/34 726/9 |
| 2013/0132719 A1* | 5/2013 | Kobayashi | G11B 20/00898 713/158 |
| 2014/0208104 A1* | 7/2014 | Yoon | H04L 9/3247 713/168 |
| 2014/0304505 A1* | 10/2014 | Dawson | H04L 63/0428 713/165 |
| 2014/0325605 A1* | 10/2014 | Jung | G06F 21/78 726/4 |
| 2014/0337410 A1* | 11/2014 | Mraz | H04L 63/20 709/203 |
| 2014/0380063 A1* | 12/2014 | Kobayashi | G06F 21/10 713/193 |
| 2015/0019871 A1* | 1/2015 | Huang | H04L 9/3247 713/176 |
| 2015/0047021 A1* | 2/2015 | Touboul | H04L 63/1441 726/19 |
| 2015/0229646 A1* | 8/2015 | Ely | H04L 63/20 726/1 |
| 2016/0306966 A1* | 10/2016 | Srivastava | H04L 63/08 |
| 2016/0328579 A1* | 11/2016 | Jois | G06F 21/85 |
| 2017/0262632 A1* | 9/2017 | Jaman | G06F 21/564 |
| 2017/0337370 A1* | 11/2017 | Chereshnev | G06K 9/6215 |
| 2017/0353460 A1* | 12/2017 | Knapp | G06F 21/602 |
| 2017/0353461 A1* | 12/2017 | Knapp | H04L 63/10 |
| 2017/0353475 A1* | 12/2017 | Hutton | G06F 21/56 |
| 2018/0091484 A1* | 3/2018 | Atta | H04L 63/0428 |
| 2018/0097821 A1* | 4/2018 | Benitez | H04L 63/1425 |
| 2019/0028441 A1* | 1/2019 | Thakkar | G06F 21/10 |
| 2019/0207984 A1* | 7/2019 | Ely | H04L 63/14 |
| 2019/0251279 A1* | 8/2019 | Emberson | G06F 21/6218 |

* cited by examiner

SECURE DATA TRANSFER DEVICE

BACKGROUND

Data transfers from a computer infected with malware may be problematic for untrained security users. Unintentionally, users may transfer malicious files from an infected computer to an uninfected computer. For untrained security users, the conventional practice is to discourage data transfers from infected computers.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
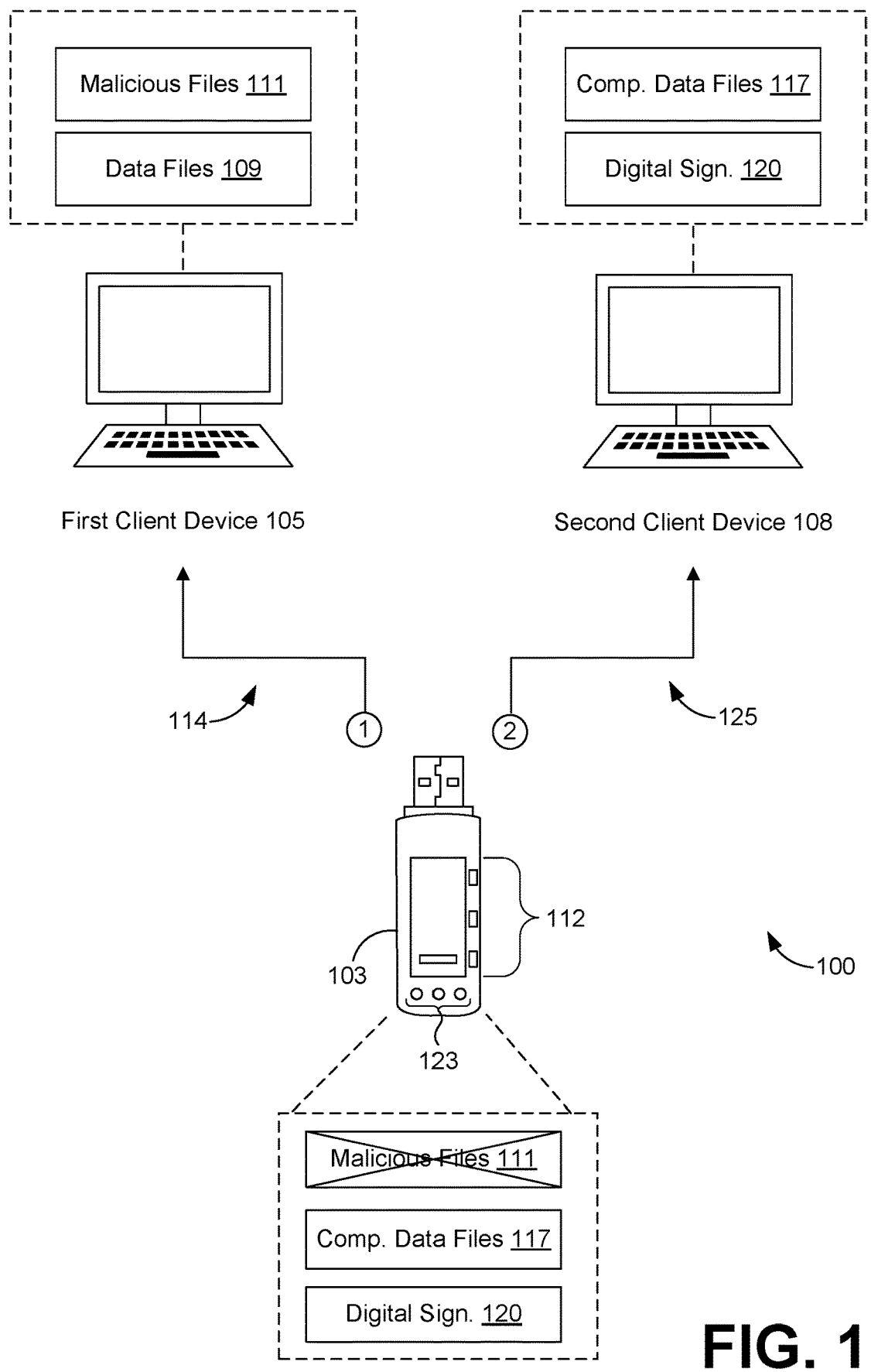
FIG. 1 is a pictorial drawing of a universal serial bus (USB) storage device being used to transfer data files from a first client device to a second client device according to various embodiments of the present disclosure.

The present disclosure relates to a secure data transfer device for automated security policy compliance and data integrity verification during data transfer operations. During a security incident, it is common that data needs to be copied from a computer system, which may have unverified data or malware-infected data, to a trusted system for analysis, backup, or saving configurations. In addition, the unverified or potentially malware-infected system may need to be disconnected from a network due to security concerns. Current practice depends on security professionals to monitor the transfer of data files from an unverified or potentially malware-infected computer system because other users may be unskilled in identifying potentially malicious files from an infected system before performing a data transfer to another uninfected system. However, even trained professionals may unintentionally transfer malware data from a malware-infected system. For at least these reasons, security professionals discourage untrained users from transferring files from an infected system to another system.

Various embodiments of the present disclosure introduce a storage device that enables the safe transfer of data from a first system to a second, system. The first system may be a computing device where configuration or environment settings have not been verified, a computing device where malicious files have been identified (e.g., malware, viruses, etc.), and other suitable security concerns. The second system may be a trusted system in which there are no security concerns. A security policy can be enforced on data before it is transferred to the trusted system. A user can set and/or update a security policy on the storage device. The security policy can comprise a set of conditions that identify potentially malicious files. Upon receiving a data transfer request, the requested data files can be analyzed to determine whether the files comply with the security policy. A remedial action may be performed on data files that fail to comply with the security policy, which prevents the identified files from being accessible to another device. In addition, cryptographic methods can be used to validate that the compliant data files have not been modified since their compliance check.

As one skilled in the art will appreciate in light of this disclosure, certain embodiments may be capable of achieving certain advantages, including some or all of the following: (1) improving computer system and network security by identifying and removing potentially malicious files during a data transfer operation according to a configurable policy, which enables safe data transfers from computer systems where configuration or environment settings have not been verified or where malicious files have been identified (e.g., malware, viruses, etc.); (2) improving computer system and network security by capturing potentially malicious files and storing the potentially malicious files in a quarantined memory location on a removable storage device for later analysis; (3) improving computer security threat analysis by providing a policy version that indicates a version of the security policy that was used to validate the compliance of the data files; (4) improving computer security by automating encryption as files are transferred to a storage device and determined to be compliant to a security policy; (5) improving computer security threat analysis by using cryptographic methods to assure that policy compliant data files have not been modified since their compliance check; (6) improving computer system and network security by providing an ability to safely transfer data through a portable storage device even if a malware infected system cannot be connected to a network due to security concerns; and (7) improving computer security by reducing time spent transferring backup data files from an infected system to an uninfected system. In the following discussion, a general description of the system and its components is provided, followed by a discussion of the operation of the same.

Beginning with FIG. 1, shown is an example scenario 100 of a portable storage device 103 used to transfer data from a first client device 105 to a second client device 108. In some embodiments, the portable storage device 103 may be a USB storage device. The first client device 105 may represent a device that has data files 109 and malicious files 111. The data files 109 can correspond to benign files that are not a security threat. The malicious files 111 can correspond to files containing a virus, malware, or some other potential security threat.

In the depicted scenario 100, a user may be aware that the first client device 105 potentially has malicious files 111 because of a security incident. Alternatively, the first client device 105 may have data or settings that have not been verified or analyzed. The portable storage device 103 has a physical switch 112 for changing the operating mode. In this example scenario 100, the portable storage device 103 has three positions, where each position corresponds an operating mode for the portable storage device 103. For this non-limiting scenario 100, the portable storage device 103 has a safe-write operating mode, a read-only operating mode, and an administration operating mode. In the depicted scenario 100, the physical switch 112 is presently in a first position for a safe-write operating mode.

As referenced by 114, the portable storage device 103 can first be connected to a USB port of the first client device 105. On the first client device 105, a user can request data to be transferred to the portable storage device 103. The data transfer request can be received by the portable storage device 103. The portable storage device 103 can detect that the physical switch 112 is presently in the safe-write operating mode. After initiating the data transfer, the data files 109 and the malicious files 111 are transferred to memory of the portable storage device 103.

In safe-write mode, the portable storage device 103 can process the files to determine whether each file complies with a configured security policy. As depicted in FIG. 1 with an "X," the malicious files 111 are identified as failing to comply with the security policy. The malicious files 111 may be identified as containing malicious code referenced in the security policy. Thus, the malicious files 111 are made to be inaccessible to another device (e.g., the second client device 108). The malicious files 111 may be configured as inaccessible by removing the malicious files 111 from memory of the portable storage device 103, moving the malicious files 111 to a quarantined section of memory of the portable storage device 103, or some other suitable remedial action.

In addition, the portable storage device 103 may determine that the data files 109 comply with the security policy and do not pose a security threat. At this point, the data files 109 are validated and now are considered as compliant data files 117. The portable storage device 103 can use cryptographic methods to ensure that the compliant data files 117 have not been modified since they were validated for policy compliance.

In this example scenario 100, the portable storage device 103 can generate a digital signature 120 by signing the compliant data files 117. The portable storage device 103 may use a signature key to sign the compliant data files 117 in order to generate the digital signature 120. The digital signature 120 can include a policy version that refers to a particular security policy that was used to validate the compliant data files 117. The policy version can serve as a reference for users to understand which set of conditions or rules were applied when checking for policy compliance. After the digital signature 120 has been generated, the portable storage device 103 can illuminate one or more indicators 123, such as a light emitting diode (LED).

As shown in FIG. 1, the portable storage device 103 has three indicators 123 in this example. The indicators 123 can be controlled to display various colors and/or pulse at various different rates. The various colors and pulsing rates can be used to represent the current mode and/or different stages of the processing of the transferred data files 109. For example, a single indicator 123 can display the color green to indicate that a compliance processing workflow is finished and that the portable storage device 103 can be removed from the first client device 105. In another example, a single indicator 123 can blink yellow at a particular rate to indicate that the compliance processing workflow has not finished processing the data files 109 for compliance. In another example, one or more indicators 123 can be used to reflect a result of the analysis. For instance, an indicator 123 can be illuminated red to represent the detection of a malicious file. In another example, a first indicator 123 can be illuminated red and a second indicator 123 can be illuminated yellow to indicate a particular an error code from processing the data files 109. In some examples, the various colors and/or blinking rates of the indicators 123 can indicate a remedial action after the detection of a security threat or an error code occurring on the portable storage device 103.

Next, the physical switch 112 of the portable storage device 103 can be switched to a second position that corresponds to a read-only operating mode. The portable storage device 103 can be connected to a USB port of the second client device 108, as referenced by 125. The second client device 108 corresponds to a system that is not infected with a virus, malware, or some other security threat.

Upon receiving power from the second client device 108, the portable storage device 103 can detect that it is in the read-only mode of operation. The portable storage device 103 can appear as a mass storage device to the second client device 108. At this stage, the portable storage device 103 can present to the second client device 108 only files that are compliant with the security policy of the portable storage device 103 and have a digital signature 120 for validation. In other words, the malicious files 111 are not rendered on the second client device 108 in a user interface because the malicious files 111 are inaccessible to the second client device 108. In some examples, the portable storage device 103 may make the malicious files 111 inaccessible by encrypting the malicious files 111 and other content such that they are not usable unless a decryption key is provided. In other examples, the portable storage device 103 may make the malicious files 111 inaccessible by way of restrictions enforced on a file system. For instance, the storage location of the malicious files 111 may prevent access to the malicious files 111 and other content unless the user is authenticated.

Upon receiving a data transfer request from the second client device 108, the portable storage device 103 can transfer the compliant data files 117 and the digital signature 120 to the second client device 108. Thus, the malicious files 111 are prevented from being transferred, copied, accessed, or executed with respect to the second client device 108

Figure 2:
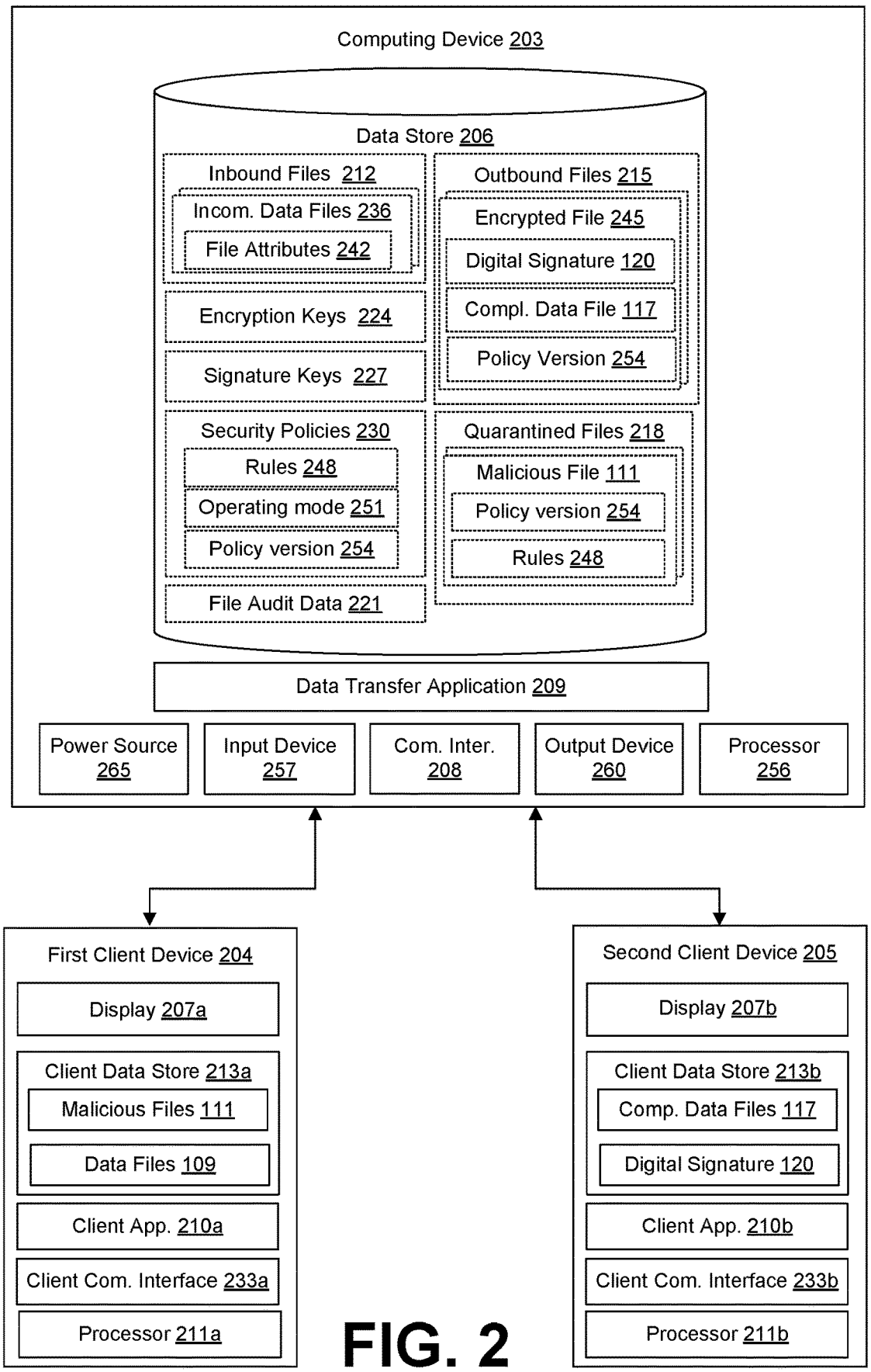
FIG. 2 is a drawing of a computing device, a first client device, and a second client device according to various embodiments of the present disclosure.

With reference to FIG. 2, shown is an example block diagram of a computing device 203, a first client device 204, and a second client device 205 according to various embodiments. The computing device 203 is configurable to be in data communication with the first client device 204 and the second client device 205 via a communication interface 208. The communication interface 208 includes, for example, a USB interface, an Ethernet interface, a Wi-Fi interface, a Bluetooth interface, a Near Field Communication (NFC) interface, a wireless interface, a wired interface, a satellite network interface, a Radio Frequency Identification (RFID) interface, fiber optics or other suitable data communication interfaces.

Various applications and/or other functionality may be executed in the computing device 203 according to various embodiments. Also, various data is stored in a data store 206 that is accessible to the computing device 203. The data store 206 may be representative of a plurality of data stores 206 as can be appreciated. The data stored in the data store 206, for example, is associated with the operation of the various applications and/or functional entities described below.

The components executed on the computing device 203, for example, include a data transfer application 209 and other applications, services, processes, systems, engines, or functionality not discussed in detail herein. The data transfer application 209 is executed to determine whether transferred data files 109 are compliant with a security policy and to generate digital signatures for the compliant data files 117 to validate that the compliant data files 117 have not been modified since they were checked for policy compliance. Additionally, the data transfer application 209 can encrypt the compliant data files 117 and the associated digital signatures 120.

The data stored in the data store 206 includes, for example, inbound files 212, outbound files 215, quarantined files 218, file audit data 221, encryption keys 224, signature keys 227, security policies 230, and potentially other data. Inbound files 212 may represent a memory location of the data store 206 for incoming data files 236 from a respective client device, such as a potentially infected client device. In other words, during a data transfer operation, the files from the respective client device are first stored in the inbound files 212 and designated as incoming data files 236.

The incoming data files 236 may comprise both data files 109 and malicious files 111 before being processed for compliance according to a security policy 230. File attributes 242 of the incoming data files, such as a file extension, a file type, a file size, metadata, and other suitable file attributes related to the file, can be analyzed for policy compliance.

Outbound files 215 may represent a memory location of the data store 206 for compliant data files 117, which are compliant according to a security policy. Each compliant data file 117 can have a corresponding digital signature 120. The digital signature 120 can be used to verify that the compliant data file 117 has not been modified since it was processed for compliance. The digital signature 120 can be generated with the use of a signature key 227 for signing the compliant data files 117. The digital signature 120 can be generated using a hash function, a checksum function, a private key from a public-private key pair, and other suitable cryptographic techniques. The digital signature 120 can also be associated with a policy version 254 of the security policy 230.

Quarantined files 218 may represent a memory location in the data store 206 for incoming data files 236 that fail to comply with one or more of the security policies 230. In some embodiments, the quarantined files 218 may be located in a section of memory that is isolated from other memory sections used for the inbound files 212 and/or the outbound files 215. In some cases, the section of memory including quarantined files 218 may be physically, electrically, and/or communicatively separated from other memory sections. In other words, a separation (e.g., a hardware separation, communicative separation, and/or electrical separation) between a first memory section for the quarantined files 218 and a second memory section for the inbound files 212 and/or the outbound files 215 can help ensure that the quarantined files 218 cannot be accessed unless by way of an authentication process in an administrative mode of operation. For example, the memory location for the quarantined files 218 may comprise a physically separate memory device with separate addressing for the quarantined files 218. In some cases, a first section of memory for the quarantined files 218 may be electromagnetically isolated from a second section of memory for the inbound files 212 and/or the outbound files 215 by a sufficient air gap or an electromagnetic shield configured to block stray emissions.

In other cases, the separation may be implemented by configuring the electrical traces of the first section of memory for the quarantined files 218 to be physically separated by a sufficient distance from electrical traces for a second section of memory for the inbound files 212 and/or the outbound files 215.

In some embodiments, read operations may be disable for the memory location of the quarantined files 218. Further, in these embodiments, the read operations may be enabled after an administrative user is authenticated in an administrative mode.

The quarantined files 218 may include the identified malicious files 111 and/or other non-compliant data files. In some embodiments, a policy version 257 of a security policy 230 that was used to identify the file as malicious can be stored in association with the malicious file 111. In another embodiment, the rule(s) 248 that identified the incoming data file 236 as malicious can be stored in the quarantined files 218 section. In other embodiments, the rules 248 may be omitted from the quarantined files 218 section.

Upon failing one or more security policies, the incoming data file 236 can be classified based on one or more particular conditions that led to the compliance failure. For example, the incoming data file 236 can be labeled as a malicious file 111, incorrect file extension, excess file size, and other suitable description conditions for a compliance failure. In addition, the data transfer application 209 can select a remedial action to be perform on the file based on the classification. For example, the security policy 230 can specify that the remedial action for malicious files 111 comprises deleting the files from the memory of the computing device 203. In another instance, the remedial action for files that have an incorrect file extension may comprise keeping the file in the quarantined files 218 for further analysis.

File audit data 221 may include an activity log of a compliance processing workflow. The file audit data 221 may also include data related to determining whether incoming data files 236 are compliant with a security policy 230. For example, the file audit data 221 may include data indicating reasons for the compliance failure of a data file 109. The data may indicate a specific policy version 254 that was used and the rules 248 or conditions that led to the compliance failure. In some embodiments, the file audit data 221 is accessed by authenticated users in an administrative mode of the computing device 203.

Encryption keys 224 may include one or more keys for encrypting data in the outbound files 215. Encrypted files 245 can represent that files that have been encrypted after they have passed compliance and have a digital signature 120. When the computing device 203 is in a read-only operating mode, encryption credentials may be needed to access the digital signature 120, the compliant data files 117, and the policy version 254. The encryption key 224 may refer to different key pair schemes for encrypting the outbound files 215. In some embodiments, the encryption of the compliant data files 117 is omitted. Signature keys 227 may include one or more keys for signing the compliant data files 117 in order to generate a digital signature 120. The signature key 227 can refer to different signature key schemes that can be used to verify the authentication of the compliance process on the computing device 203.

Security policies 230 can include a set of rules 238 for analyzing incoming data files 236 before they are accessible to another device (e.g., second client device 205). The rules 238 may include restrictions and/or conditions for identifying files that may pose potential security threats. Some non-limiting examples of rules 248 may include identifying a blacklist of files, a whitelist of files, file extensions, malicious shell code, file sizes that exceed a size threshold, macros contained in files, and other suitable rules for identifying potential security threats.

In one embodiment, among others, the security policy 230 may be applied to an incoming data file 236 after it is stored in memory of the computing device 203. In other embodiments, the incoming data files 236 are analyzed according to the security policy 230 before they are transferred to the computing device 203. For example, the data transfer application 209 can determine policy compliance during a read operation on the first client device 204.

Additionally, the security policy 230 may include data relating to multiple operating modes 251 and a policy version 254. The operating mode 251 can represent an indication of which features, functions, and/or capabilities of the computing device 203 are available to a user. For example, an operating mode 251 may represent a read-only mode, a write-only mode, an administrative mode, and other suitable operating modes. In some cases, the operating modes 251 can be selected according to a user manipulation of the input device 257, such as a mode selector switch.

In another embodiment, an operating mode may be executed with a specific security policy 230. For example, there may be multiple security policies 230 that can applied for writing or reading data to the computing device 203. For example, there may be two different security policies 230 that can operate a write-only mode. These two security policies can have a different set of rules 248. These two security policies 230 can be applied when attempting to write to the computing device 203. Thus, when either of these two security policies 230 are selected, the computing device 203 is set in a write-mode of operation. For instance, a first security policy 230 and a second security policy 230 may comprise different restriction tiers, where the second security policy 230 may be more restrictive than the first security policy 230 when writing data to the computing device 203.

The policy version 254 can refer to a particular security policy 230 at a particular instance. In some instances, the policy version 254 can refer to a version number. The policy version 254 allows for users to know which version of a security policy 230 was used to validate the compliance of the incoming data files 236. This information allows administrative users to know which set of rules 248 were used during the processing, which is relevant as security policies 230 are updated over time.

The computing device 203 may also include a processor 256, an input device 257, an output device 260, and a power source 265. The processor 256 may refer to one or more processing units that can be used to execute the data transfer application 209, an operating system, and other software components on the computing device 203. The processor 256 may comprise a general purpose processor, a cryptographic processor, an ARM-based processor, a microcontroller, an application-specific integrated circuit (ASIC), a trusted platform module (TPM), and other suitable processing units.

The input device 257 can be manipulated by a user to control the operation of the computing device. For example, the input device 257 may comprise a mode selector switch that can be used to select a mode of operation and/or a security policy 230. In other cases, the input device 257 may be used to select a remedial action for detected security threats and/or display information related to the processing of the data files 109 via the output device 260. The input device 257 may comprise a physical switch, one or more buttons, a dial, a knob, a microphone, and other suitable input devices. In one implementation, a sliding switch can be moved to a first position, a second position, or a third position. Each position can correspond with one of a read-only mode, a write-only mode, or an administrative mode. In another implementation, an output device 260, e.g., a digital display, and one or more buttons may be used to select an operating mode and/or a security policy 230. For instance, one or more buttons may be used to select an operating mode and/or one of several security policies 230 on a digital display. In some implementations, the input device 257 can be a microphone and the output device 260 can be a speaker. Users can provide voice commands to operate the computing device 203, such as commands for switching the mode of operation for the computing device 203.

The read-only mode can represent a mode of operation where the computing device 203 presents itself as a storage device to another client device 204, 205. However, the client devices 204, 205 can only access compliant data files 117. Thus, quarantined files 218 are not accessible to another respective client device 204, 205. The write-only mode can represent a process for writing data to the computing device 203. The process may comprise analyzing incoming data files 236 according to a security policy 230 before the incoming data files 236 are accessible to another device. In read-only mode and write-only mode, the computing device 203 can operate with the native file browser of the operating system executed on the first client device 204 and/or the second client device 205.

The administrative mode can represent a mode of operation where authenticated users can update or define one or more security policies 230. The administrative mode can provide access to an administrative console that allows a user to execute restrictive functions and access restrictive data, such as file audit data 221, quarantined files 218, and other restrictive data.

The output device 260 can refer to a visual indicator, such as a light-emitting diode (LED), a liquid crystal display (LCD), a light bulb, or some other visual interface. The output device 260 may also refer to a speaker that emits audible sounds. The output device 260 can be activated to indicate visually or audibly error code information, a result of a security policy analysis, whether the computing device 203 has finished a compliance processing workflow for the incoming data files 236, and other relevant information. As a digital display, the output device 260 can render a progress bar to indicate the present status of a compliance progressing workflow. A digital display can also render error codes, results of the analysis, remedial actions for detected errors or security threats, file names, selected security policies, a selected operating mode, and other security analysis data.

The first client device 204 and the second client device 205 are representative of a plurality of client devices that may be coupled to the computing device 203 via the communication protocol associated with the communication interface 208. The first client device 204 and the second client device 205 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, head-mounted displays, voice interface devices, Internet of Things (IoT) devices, or other devices with like capability. The first client device 204 and the second client device 205 may include a processor 211a, 211b and a display 207a, 207b. The processor 211a, 211b may comprise a general purpose processor, a microcontroller, and other suitable processing units. The display 207a, 207b may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The first client device 204 and the second client device 205 may be configured to execute various applications such as a client application 210a, 210b and/or other applications. The client application 210a, 210b may be executed in the first client device 204 and the second client device 205, for example, to access network content served up by a network and/or other servers, thereby rendering a user interface on the display 207a, 207b. To this end, the client application 210a, 210b may comprise, for example, a browser, a dedicated application, etc., and the user interface may comprise a network page, an application screen, etc. The client application 210a, 210b can also refer to an operating system and its components, such as a file browser for accessing files on a device. The first client device 204 and the second client device 205 may be configured to execute applications beyond the client application 210a, 210b such as, for example, email applications, social networking applications, word processors, spreadsheets, and/or other applications.

The first client device 204 may have data stored in a client data store 213a. The second client device 205 may have data stored in a client data store 213b. The data stored in the client data store 213a includes, for example, malicious files 111 and data files 109. The malicious files 111 can represent the first client device 204 is infected with a virus, malware, or some other security threat. In other scenarios, the first client device 204 may be a computing device with suspicious or unverified data. The data stored in the client data store 213b includes, for example, compliant data files 117 and digital signatures 120. The second client device 205 represents an uninfected, trusted device.

The first client device 204 and the second client device 205 may also include a client communication interface 233a, 233b. The client communication interface 233a, 233b is used to establish a data communication channel with the communication interface 208 of the computing device 203. The client communication interface 233a, 233b may include, for example, a USB interface, an external serial AT attachment (eSATA) interface, a serial interface, a parallel interface, a FIREWIRE interface, an Ethernet interface, a Wi-Fi interface, a Bluetooth interface, a Near Field Communication (NFC) interface, a wireless interface, a wired interface, a satellite network interface, a Radio Frequency Identification (RFID) interface, fiber optics or other suitable data communication interfaces.

The power source 265 can provide power to the computing device 203. The power source 265 can include a battery, alternating current (AC) adapter, wireless power receiver, or other suitable power sources. In some embodiments, the computing device 203 may receive power by way of the communication interface 208, such as a USB connection. In some scenarios, the power supplied by the communication interface 208 may be interrupted while the computing device 205 is still processing the incoming data files 236. For example, the computing device 203 may be disconnected from the first client device 204 because the communication interface 208, e.g. the USB connection, is disconnected. In this scenario, a battery may be relied upon for power to allow the computing device 203 additional time to finish determining whether the incoming data files 236 are compliant to a security policy 230 and generating digital signatures 120 for the compliant data files 117.

Next, a general description of the operation of the various components of the computing device 203 is provided. To begin, the first client device 204 is assumed to be a potential security threat device. The first client device 204 may be potential security threat for a variety of reasons. For example, the first client device 204 may be involved in a security incident, may have experienced abnormal activity, may be a foreign client device with respect to a corporate network, may have unverified data, and other potential security threats. Data files 109 may need to be extracted from the first client device 204 for analysis, back-up, and saving configuration information. In this example, the communication interface 208 for the computing device 203 is a USB interface. The USB interface of the computing device 203 can be connected to the USB interface of the first client device 204. The computing device 203 can receive power from the first client device 204. Upon booting up, the computing device 203 can determine from the input device 257 that the computing device 203 is configured for write mode. The write mode may correspond with a particular security policy 230.

On the first client device 204, a data transfer request can be initiated by a user. The user can request data, which may include data files 109 and malicious files 111, from the client data store 213a to be transferred to the computing device 203. In other scenarios, the first client device 204 may initiate an automated data transfer request associated with an operating system or an application executed on the first client device 204. The data files 109 and the malicious files 111 can be stored in inbound files 212 and designated as incoming data files 236. The data transfer application 209 can initiate a compliance processing workflow for the incoming data files 236. In one example, the compliance processing workflow may comprise checking for policy compliance for the incoming data files 236, storing the incoming data files 236 in memory according to whether the incoming data files 236 comply to the security policy 230, generating a digital signature 120 for compliant data files 117, and encrypting the compliant data files 117 and the digital signature 120. At the compliance stage, the file attributes 242 and the content of the incoming data files 236 can be processed to determine whether the incoming data files 236 are compliant with the security policy 230.

In one example scenario, the malicious files 111 can be identified from incoming data files 236. The malicious files 111 may be identified because of the detection of malicious shell code. The malicious files 111 may be transferred to the quarantined files 218 location. A policy version 254 of the security policy 230 can be stored in association with the malicious file 111. At the quarantined files 218 location, restrictions may be configured to isolate the stored files and prevent the files from being accessed or executed. Alternatively, the malicious files 111 may be deleted instead.

Incoming data files 236 that have passed the compliance check can be transferred to the outbound files 215. The data transfer application 209 can generate a digital signature 120 for the compliant data files 117. The digital signature 120 can be generated using a checksum function, a hash function, a private key of a public/private key pair, and other suitable cryptographic protocols.

The digital signatures 120 can be used to validate that the compliant data files 117 have not been modified since their compliance was verified. Additionally, a policy version of the security policy 230 can be stored in association with the digital signature 120.

Subsequently, one or more of the compliant data files 117, the digital signature 120, and the policy version 254 are encrypted with an encryption key 224. Next, the data transfer application 209 can activate an indicator 123 to signal that the computing device 203 has finished processing the incoming data files 236 for compliance and generating the digital signatures 120 for the compliant data files 117.

At this stage, the computing device 203 can be removed from the first client device 204 and connected to the USB port of the second client device 205. The input device 257 can be manipulated to place the computing device 203 in a read-only mode of operation. In the read-only mode, the computing device 203 checks that the compliance processing workflow has been completed for the incoming data files 236. Then, the computing device 203 can present itself as a USB mass storage device, which can allow the compliant data files 117 and the digital signatures 120 to be accessible to the second client device 205. USB ports, USB mass storage devices, and other USB components may be embodied according to any of the various USB specifications, such as, for example, Universal Serial Bus Specification Revision 2.0, published on Apr. 27, 2000 by the USB 2.0 Promoter Group (available from www.usb.org), Universal Serial Bus Specification Revision 3.0, published on Nov. 12, 2008 by the USB 3.0 Promoter Group (available from www.usb.org), etc. A user can then transfer the compliant data files 117, the digital signature 120, and the policy version 254 to the second client device 205. Thus, the detected malicious files 111 are not presented to the user of the second client device 205 as being accessible. Additionally, the malicious files 111 are prevented from executing or being transferred to the second client device 205.

In another embodiment, the computing device 203 can operate as a storage host device that analyzes data files 109 from removable storage devices and removes potentially malicious files 111 from the removable storage device. For example, the computing device 203 may be a USB storage host that has one or more USB port interfaces. In this example, a standard USB thumb drive can be inserted into a USB port of a first client device 204, which has been identified as being compromised. From the first client device 204, backup data can be transferred to the USB thumb drive, where the backup data may contain data files 109 and malicious files 111. Then, the USB thumb drive can be inserted into a USB port of the USB storage host. The USB storage host can access the backup data on the USB thumb drive and enforce a selected security policy 230. If a data file 109 fails to comply with the security policy 230, a remedial action can be executed according to a rule 448 of the security policy 230. For example, the remedial action may involve deleting detected malicious files 111 from the USB thumb drive or moving the malicious file 111 from the USB thumb drive to the USB storage host for further analysis. As a result, in this non-limiting example, the only remaining files on the USB thumb drive may be compliant data files 117 of the security policy 230. In other words, the USB storage host can clean the USB thumb drive of any non-compliant files of a security policy 230. Then, the USB thumb drive can be used to transfer the backup data to a second client device 205, in which the backup data now contains just the compliant data files 117 and the digital signatures 120.

Figure 3:
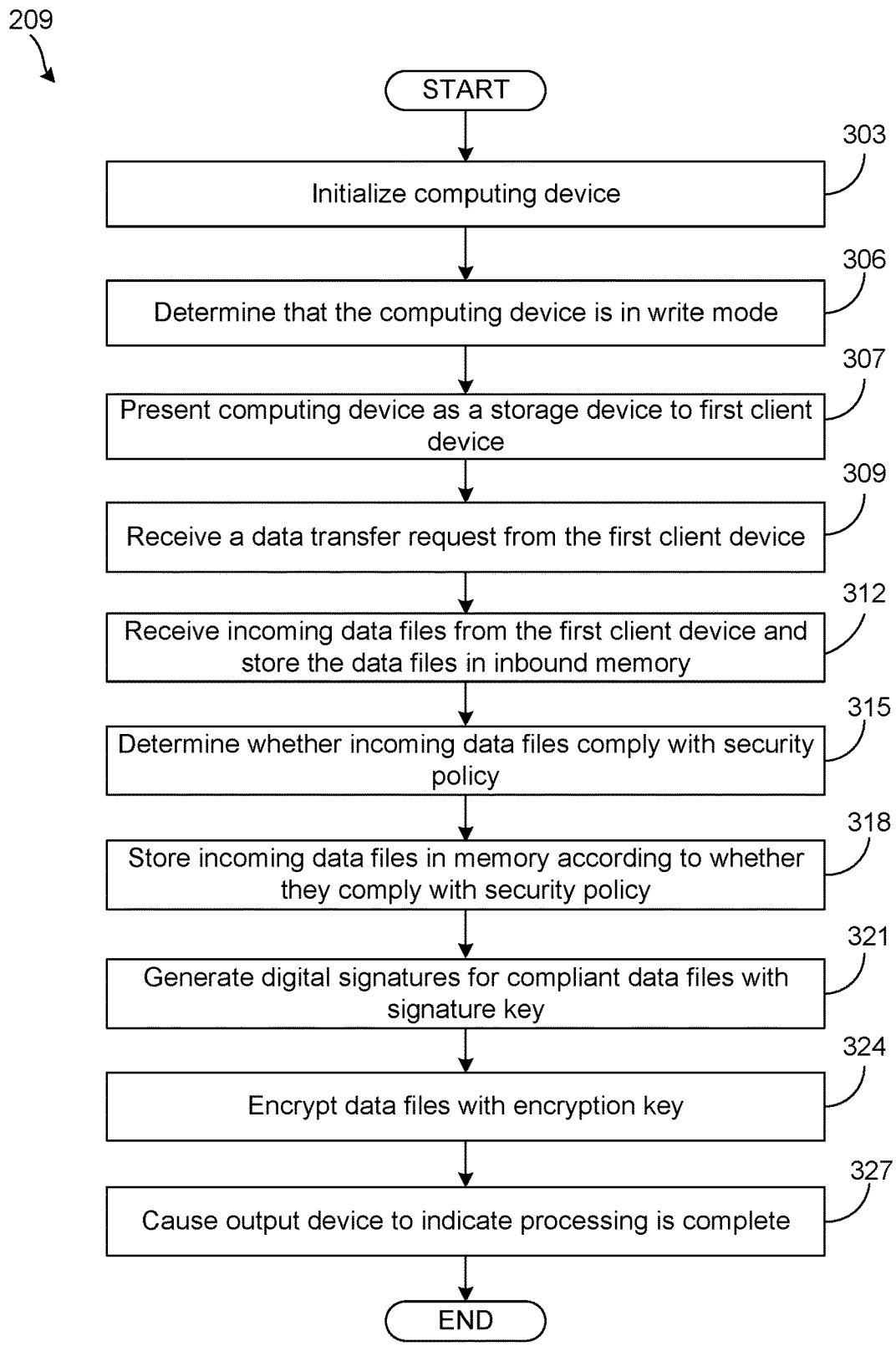
FIG. 3 is a flowchart illustrating one example of functionality implemented as portions of a data transfer application operating in write mode on the computing device of FIG. 2 according to various embodiments of the present disclosure.

Referring next to FIG. 3, shown is a flowchart that provides one example of the operation of a portion of the data transfer application 209 in write mode according to various embodiments. It is understood that the flowchart of FIG. 3 provides merely an example of the many different types of functional arrangements that may be employed to implement the operation of the portion of the data transfer application 209 as described herein. As an alternative, the flowchart of FIG. 3 may be viewed as depicting an example of elements of a method implemented in the computing device 203 (FIG. 2) according to one or more embodiments.

Beginning with box 303, the data transfer application 209 can initialize the computing device 203. In some cases, the computing device 203 may be connected to a first client device 204 via the communication interface 206. In other cases, the computing device 203 may have a power switch that is turned on. Accordingly, the computing device 203 may receive power by way of the communication interface 206, a power adapter, or some other suitable power source. Upon receiving power, the data transfer application 209 can boot up to detect a mode of operation for the computing device 203 via the input device 257 (e.g. a mode selector switch). In this example, the first client device 204 is assumed to be a potential security threat.

In box 306, the data transfer application 209 can determine that the computing device 203 is in a write mode of operation from the input device 257 (FIG. 2). In some examples, the input device 257 is a physical switch that a user can manipulate to select the mode of operation. In other cases, the input device 257 may comprise one or more buttons, a knob, or some other suitable user input mechanism. Additionally, the output device 260 (FIG. 2) can be used to display different modes of operation to facilitate a user-selection.

In box 307, the data transfer application 209 can present the computing device 203 as a storage device to the first client device 204. At this stage, the data transfer application 209 can load a storage configuration. The storage configuration can indicate to the first client device 204 that the computing device 203 is operating as a storage device with write-only functionality. For example, if the computing device 203 is connected to the first client device 204 via a USB port, the computing device 203 would present itself as a USB mass storage device to the first client device 204. In some cases, this process may comprise the computing device 203 communicating to the first client device 204 that it has a USB device class of a mass storage device. Accordingly, a standard file browser executed on the first client device 204 would be able to transfer data files 109 to the computing device 203. In other examples, the computing device 203 can establish a wired or wireless network data connection with the first client device 204. In these examples, the computing device 203 may present itself as a server with a file share feature.

In box 309, the data transfer application 209 receives a data transfer request from the first client device 204 to transfer data to the computing device 203, where the data includes data files 109 (FIG. 2) and malicious files 111 (FIG. 2). In one embodiment, the data transfer request can be generated by a user performing a drag-and-drop sequence with the data files 109 on the first client device 204.

In box 312, the data transfer application 209 facilitates the transfer of the data files 109 and the malicious files 111 with an operating system of the first client device 204. In some embodiments, the data files 109 and the malicious files are considered as incoming data files 236 (FIG. 2), which are stored in inbound files 212 (FIG. 2). In one embodiment, the inbound files 212 can have file restrictions for the incoming data files 236 before they are processed for policy compliance. The file restrictions can prohibit the incoming data files 236 from being executed, transferred, copied, and/or accessed.

In box 315, the data transfer application 209 can determine whether the incoming data files 236 comply with a security policy 230 (FIG. 2). The determination can involve identifying whether file attributes 242 (FIG. 2) of the incoming data files 236 correspond with the rules 248 (FIG. 2) specified in the security policy 230. For instance, a rule 248 may specify that incoming data files 236 with a particular file extension are transferred to quarantined files 216 (FIG. 2) for further analysis. In another instance, a rule 248 can specify a set of malicious file indicators to identify potential malicious files 111. The rule 248 can specify a remedial action for the identified malicious files 111, such as deleting the file or moving the malicious file 111 to quarantined files 218.

In box 318, the data transfer application 209 can store the incoming data files 236 based on the determination of whether they comply with the security policy 230. For example, compliant data files 117 can be transferred to outbound files 215 (FIG. 2). Incoming data files 236 that failed to comply can be transferred to quarantined file 216 or some other location according to the security policy 230.

In box 321, the data transfer application 209 can generate a digital signature 120 (FIG. 2) for the compliant data files 117. The data transfer application 209 can execute a signing function to validate that the compliant data files 117 have passed security policy compliance. Generation of the digital signature 120 can involve executing a hash function on the compliant data file 117. The digital signature 120 can also include a policy version 254 (FIG. 2), which refers to a version of the security policy 230 that validated the compliant data file 117.

In box 324, the data transfer application 209 can encrypt the compliant data file 117, the digital signature 120, and the policy version 254 with an encryption key 224 (FIG. 2). In some embodiments, the encryption of the compliant data file 117 is automated after the digital signature 120 has been generated.

In box 327, the data transfer application 209 can cause the output device 260 (FIG. 2) to indicate that the processing of the incoming data files 236 is complete. At this stage, the compliant data files 117 are accessible from the computing device 203 in at least a read mode of operation. In some embodiments, the indicator 123 is an LED on the computing device 203. The LED can illuminate upon the computing device 203 finishing the processing of the incoming data files 236. Thereafter, the operation of the portion of the data transfer application 209 ends.

Figure 4:
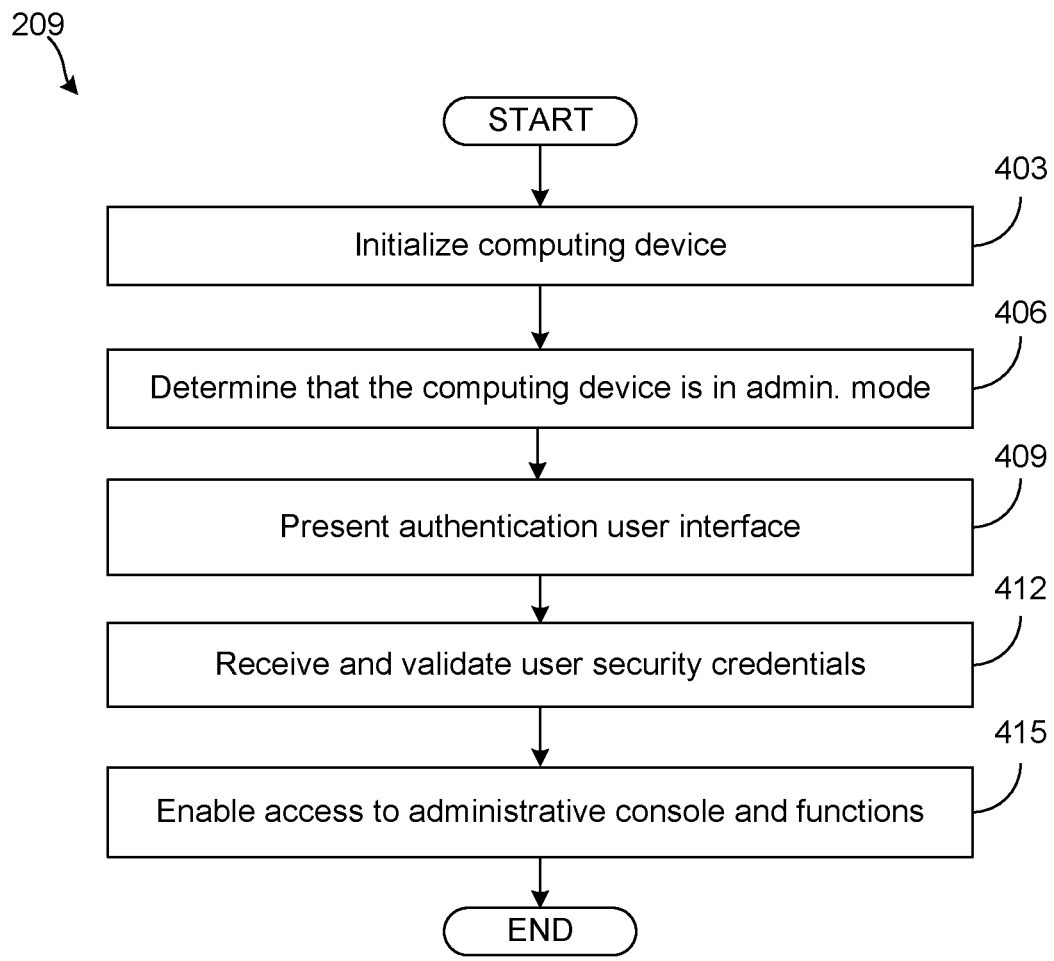
FIG. 4 is a flowchart illustrating one example of functionality implemented as portions of a data transfer application operating in administration mode on the computing device of FIG. 2 according to various embodiments of the present disclosure.

Turning now to FIG. 4, shown is a flowchart that provides one example of the operation of a portion of the data transfer application 209 in an administration mode according to various embodiments. It is understood that the flowchart of FIG. 4 provides merely an example of the many different types of functional arrangements that may be employed to implement the operation of the portion of the data transfer application 209 as described herein. As an alternative, the flowchart of FIG. 4 may be viewed as depicting an example of elements of a method implemented in the computing device 203 (FIG. 2) according to one or more embodiments.

Beginning with box 403, the data transfer application 209 can initialize the computing device 203. In this example, the computing device 203 may be connected to the first client device 204 or the second client device 205 via the communication interface 206. In other cases, the computing device 203 may have a power switch that is turned on. Accordingly, the computing device 203 may receive power by way of the communication interface 206, a power adapter, or some other suitable power source. Upon receiving power, the data transfer application 209 can boot up to detect a mode of operation for the computing device 203.

In box 406, the data transfer application 209 can determine that the computing device 203 is in an administrative mode of operation from the input device 257 (FIG. 2). The input device 257 can be manipulated to select a mode of operation for the computing device 203. In some cases, the output device 260 (FIG. 2) may also be used to display different modes of operation to facilitate a user-selection.

In box 409, the data transfer application 209 can present an authentication user interface on the first client device 204 or the second client device 205. The authentication user interface can include a user interface prompt requesting user security credentials.

In box 412, the data transfer application 209 can receive the user inputted security credentials from the authentication user interface. The security credentials can be validated with an access security directory.

In box 415, the data transfer application 209 can enable access to an administrative console upon validating the security credentials of user. The administrative console can provide access to administrative functions, such as access to quarantined files for analysis and access to file audit data 221 (FIG. 2). In addition, at the administrative console, the security policy 230 can be programmed, updated, deleted, or configured. The administrative console can enable specifying the rules 248, which can involve setting conditions and remedial actions that are performed under certain conditions. Additionally, the administrative console can allow for encryption key management. The administrative console can allow for authenticated users to configure encryption settings for the encryption keys 224. Thereafter, the operation of the portion of the data transfer application 209 ends.

Figure 5:
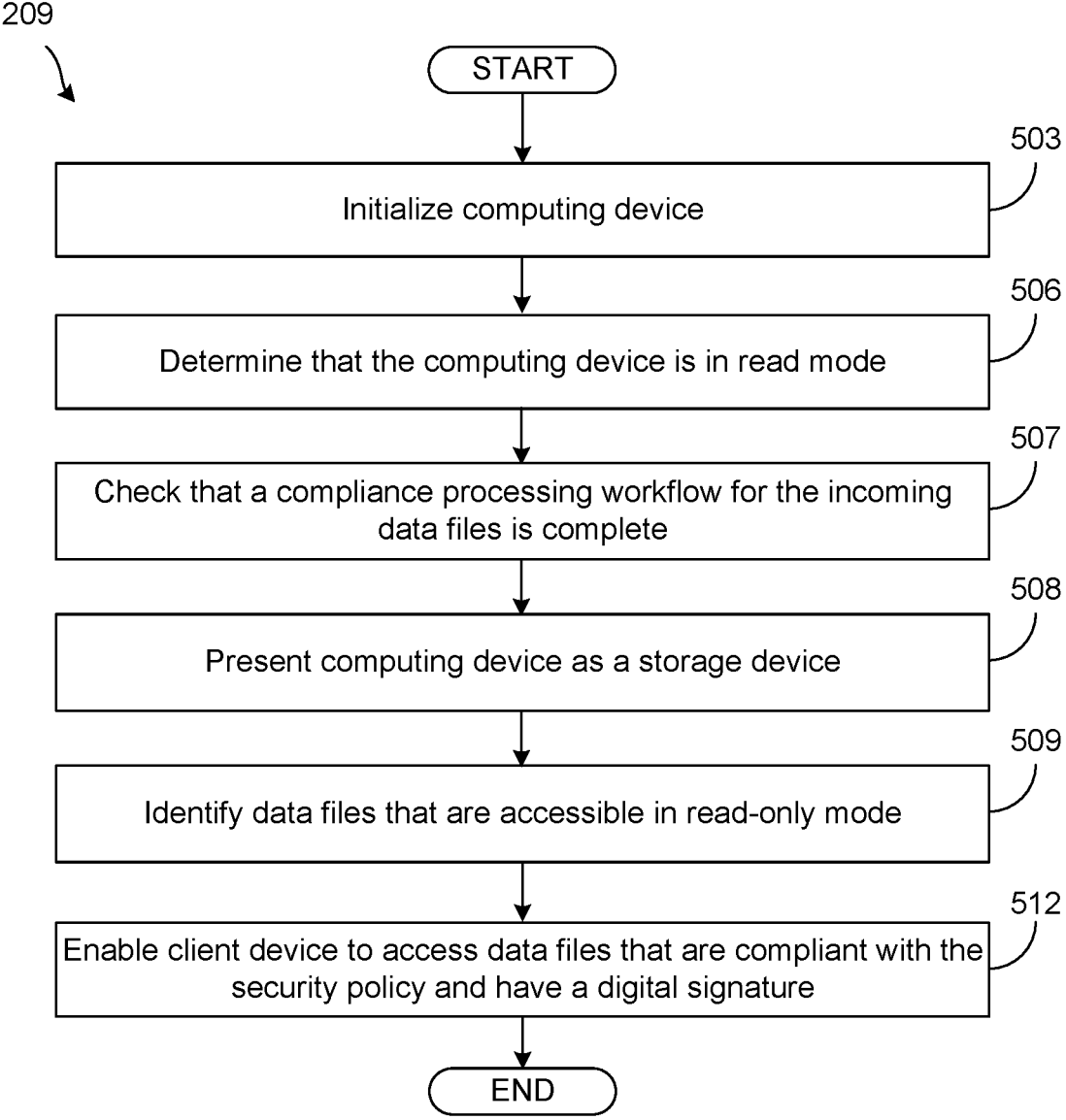
FIG. 5 is a flowchart illustrating one example of functionality implemented as portions of a data transfer application executed in read mode on the computing device of FIG. 2 according to various embodiments of the present disclosure.

Moving on to FIG. 5, shown is a flowchart that provides one example of the operation of a portion of the data transfer application 209 in a read mode according to various embodiments. It is understood that the flowchart of FIG. 5 provides merely an example of the many different types of functional arrangements that may be employed to implement the operation of the portion of the data transfer application 209 as described herein. As an alternative, the flowchart of FIG. 5 may be viewed as depicting an example of elements of a method implemented in the computing device 203 (FIG. 2) according to one or more embodiments.

Beginning with box 503, the data transfer application 209 can initialize the computing device 203. In this example, the computing device 203 may be connected to the first client device 204 or the second client device 205 via the communication interface 206. In other cases, the computing device 203 may have a power switch that is turned on. Accordingly, the computing device 203 may receive power by way of the communication interface 206, a power adapter, or some other suitable power source. Upon receiving power, the data transfer application 209 can boot up to detect a mode of operation for the computing device 203.

In box 506, the data transfer application 209 can determine that the computing device is in a read mode of operation from the input device 257 (FIG. 2). The input device 257 can be manipulated to select a mode of operation with a physical switch, a button, or some other suitable user input mechanism. The output device 260 (FIG. 2) can be used to display different modes of operation to facilitate a user-selection.

In box 507, the data transfer application 209 can check that a compliance processing workflow of the incoming data files 236 is complete. In some implementations, checking that the compliance processing workflow is complete may comprise verifying that all of the incoming data files 236 have been evaluated for compliance of a security policy 230, verifying that a digital signature 120 has been generated for the compliant data files, and verifying that the compliant data files 117 and the digital signature 120 have been encrypted. If the compliance processing workflow is complete, the data transfer application 209 can proceed to box 508. If the compliance processing workflow is incomplete, the data transfer application 209 may proceed to box 315, box 318, box 321, or box 324 (FIG. 3) to finish the compliance processing workflow.

After completing step 324, the data transfer application 209 can proceed to box 508. In some examples, the incoming data files 236 may be stored in a processing queue. The data transfer application 209 may check whether the processing queue is empty. If the processing queue is not empty, then the data transfer application 209 may proceed to box 315, box 318, box 321, or box 324 to finish the compliance processing workflow. Additionally, in some examples, the data transfer application 209 may check the file audit data 221 to determine whether the compliance processing workflow is complete. In other cases, the data transfer application 209 may access the file audit data 221 to access an error code that indicates a failure to complete a portion of the compliance processing workflow.

In box 508, the data transfer application 209 can present the computing device 203 as a storage device to the second client device 205. At this stage, the data transfer application 209 can load a storage configuration. The storage configuration can indicate to the second client device 205 that the computing device 203 is operating as a storage device with read-only functionality. For example, if the computing device 203 is connected to the second client device 205 via a USB port, the computing device 203 would present itself as a USB mass storage device to the second client device 205. In some cases, this process may comprise the computing device 203 communicating to the second client device 205 that it has a USB device class of a mass storage device. Accordingly, a standard file browser executed on the second client device 204 would be able to transfer outbound files 215 from the computing device 203.

In box 509, the data transfer application 209 can identify compliant data files 117 (FIG. 2) that are accessible in read-only mode. In some embodiments, the data transfer application 209 also identifies that the compliant data file 117 have a corresponding digital signature 120 (FIG. 2).

In box 512, the data transfer application 209 can enable the compliant data file 117 to be accessible to second client device 205 (FIG. 2). In some cases, the computing device 203 is viewed as a mass storage device and the compliant data files 117 with a digital signature 120 are presented in a user interface and accessible from the user interface. In some embodiments, encrypted files 245 are decrypted using a decryption key prior to the compliant data files 117 being accessible to the second client device 205. Thereafter, the operation of the portion of the data transfer application 209 ends.

Figure 6:
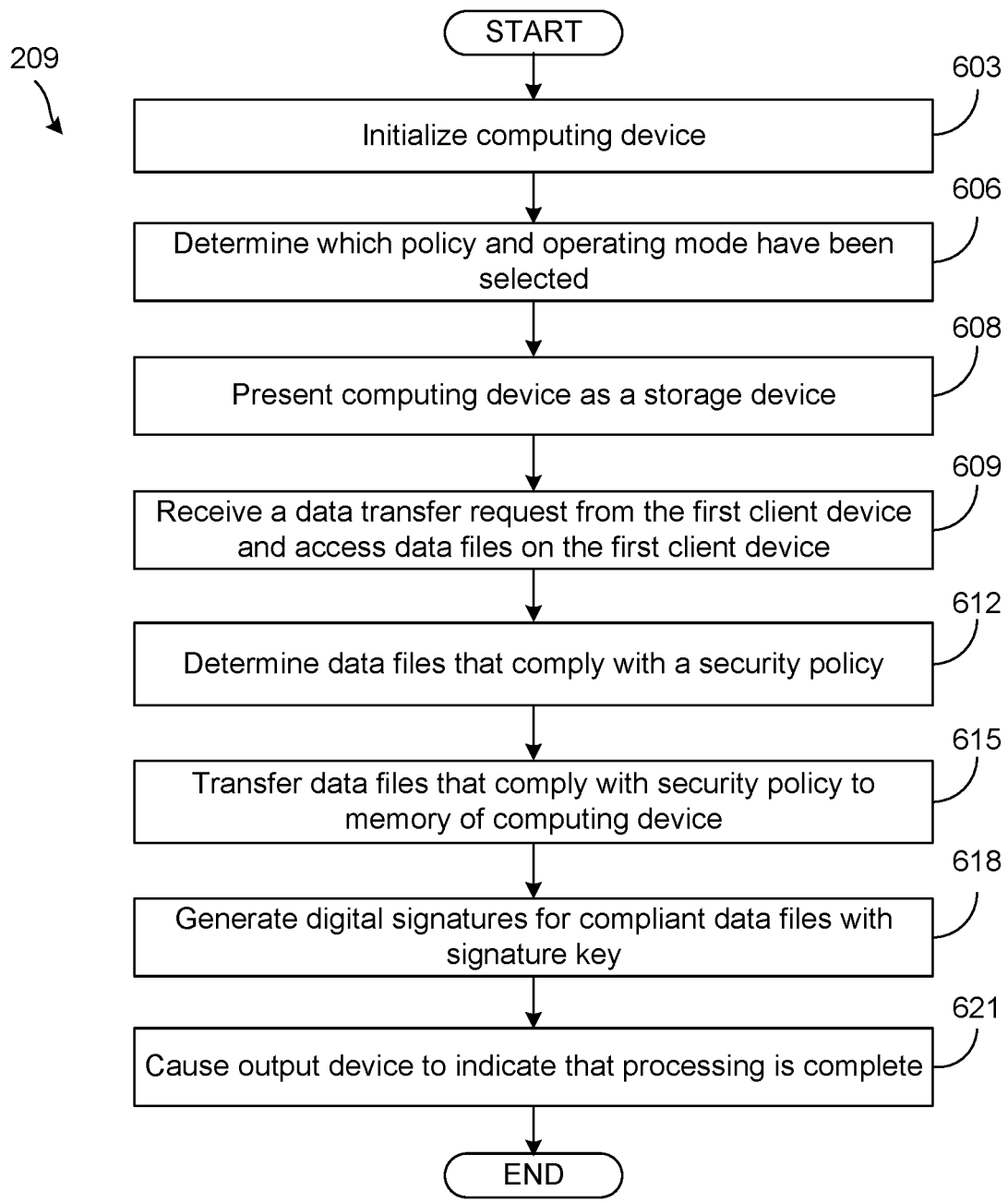
FIG. 6 is a flowchart illustrating a second example of functionality implemented as portions of a data transfer application executed in write mode on the computing device of FIG. 2 according to various embodiments of the present disclosure.

Transitioning now to FIG. 6, shown is a flowchart that provides one example of the operation of a portion of the data transfer application 209 in a write mode according to various embodiments. It is understood that the flowchart of FIG. 6 provides merely an example of the many different types of functional arrangements that may be employed to implement the operation of the portion of the data transfer application 209 as described herein. As an alternative, the flowchart of FIG. 6 may be viewed as depicting an example of elements of a method implemented in the computing device 203 (FIG. 2) according to one or more embodiments.

Beginning with box 603, the data transfer application 209 can initialize the computing device 203. In this example, the first client device 204 is a potential security threat. The computing device 203 may be connected to the first client device 204 via the communication interface 206. In other cases, the computing device 203 may have a power switch that is turned on. Accordingly, the computing device 203 may receive power by way of the communication interface 206, a power adapter, or some other suitable power source. Upon receiving power, the data transfer application 209 can boot up to detect a mode of operation for the computing device 203. In this example, the first client device 204 is assumed to be a potential security threat.

In box 606, the data transfer application 209 can determine a selected operating mode and a selected security policy. In some embodiments, the input device 257 and the output device 260 can enable a user to select a numerical value from one through ten. In this example, the numerical value of "one" may correspond to setting the computing device 203 in administrative mode. Numerical values "two" and "three" may correspond to setting the computing device in different read modes. "Two" may correspond to enabling access to files that passed a more restrictive security policy than the files that are accessible in a three setting. Values "four" through "10" may correspond with a variety of different write-only modes, where each setting applies a different security policy with different rules 248 (FIG. 2). In this example, it is assumed that a write mode of operation is selected and one of several security policies has also been selected.

In box 608, the data transfer application 209 can present the computing device 203 as a storage device to the first client device 204 according to the selected security policy 230 and/or operating mode. At this stage, the data transfer application 209 can load a storage configuration. The storage configuration can indicate to the first client device 204 that the computing device 203 is operating as a storage device with write-only functionality. For example, if the computing device 203 is connected to the first client device 204 via a USB port, the computing device 203 would present itself as a USB mass storage device to the first client device 204.

In box 609, the data transfer application 209 can receive a data transfer request from the first client device 204. The data transfer application 290 can access the files, such as data files 109 (FIG. 2) and potentially malicious files 111 (FIG. 2), associated with the data transfer request on the first client device 204. Accessing the files can involve reading the files individually on the first client device 204 instead of transferring the files as a group to the computing device 203.

In box 612, the data transfer application 209 can determine the data files 109 that comply with the selected security policy 230. The data transfer application 209 can also identify malicious files 111 among the files associated with the data transfer request.

In box 615, the data transfer application 209 can transfer the data files 109 that comply with the security policy 230 (FIG. 2) to the computing device 203. In other words, files that fail to comply with the security policy 230, such as the malicious files 111, are not transferred to the computing device 203. In box 618, the data transfer application 209 can generate digital signature 120 (FIG. 2) for the compliant data files 117. The compliant data files 117 are signed with a signature key 227.

In box 621, the data transfer application 209 can cause the output device 260 (FIG. 2) to indicate that after all of the files associated with the data transfer request have completed the compliance processing workflow. In some cases, the compliant data files 117 are also encrypted after the digital signature 120 has been generated. Thereafter, the operation of the portion of the data transfer application 209 ends.

Figure 7:
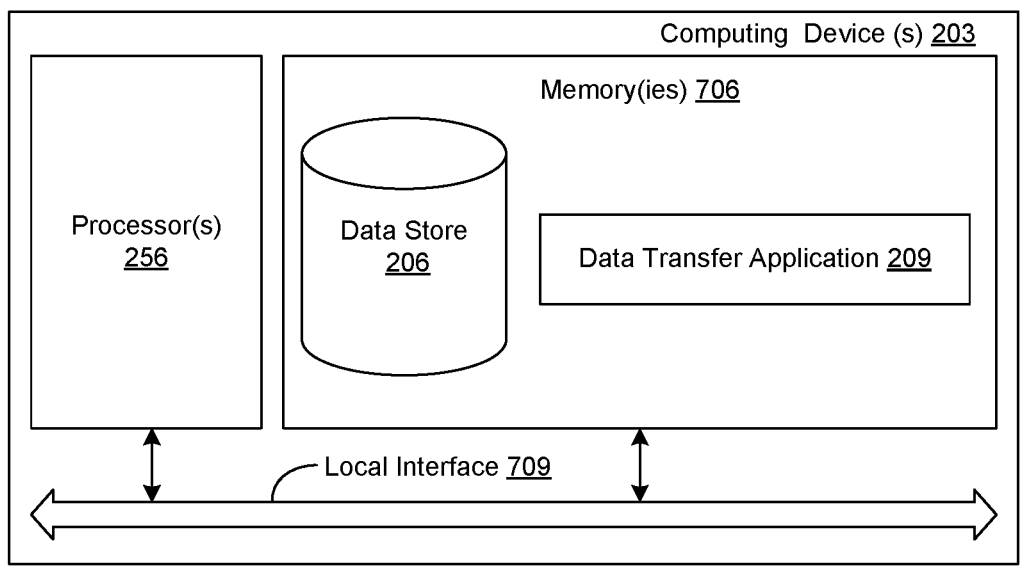
FIG. 7 is a schematic block diagram that provides one example illustration of a computing device of FIG. 2 according to various embodiments of the present disclosure.

With reference to FIG. 7, shown is a schematic block diagram of the computing device 203 according to an embodiment of the present disclosure. The computing device 203 includes at least one processor circuit, for example, having a processor 256 and a memory 706, both of which are coupled to a local interface 709. To this end, the computing device 203 may comprise, for example, at least one server computer or like device. The local interface 709 may comprise, for example, a data bus with an accompanying address/control bus or other bus structure as can be appreciated.

Stored in the memory 706 are both data and several components that are executable by the processor 256. In particular, stored in the memory 706 and executable by the processor 256 is the data transfer application 209, and potentially other applications. Also stored in the memory 706 may be a data store 206 and other data. In addition, an operating system may be stored in the memory 706 and executable by the processor 256.

It is understood that there may be other applications that are stored in the memory 706 and are executable by the processor 256 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 256. In this respect, the term "executable" means a program file that is in a form that can ultimately be run by the processor 256. Examples of executable programs may be, for example, a compiled program that can be translated into machine code in a format that can be loaded into a random access portion of the memory 706 and run by the processor 256, source code that may be expressed in proper format such as object code that is capable of being loaded into a random access portion of the memory 706 and executed by the processor 256, or source code that may be interpreted by another executable program to generate instructions in a random access portion of the memory 706 to be executed by the processor 256, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 256 may represent multiple processors 256 and/or multiple processor cores and the memory 706 may represent multiple memories 706 that operate in parallel processing circuits, respectively. In such a case, the local interface 709 may be an appropriate network that facilitates communication between any two of the multiple processors 256, between any processor 256 and any of the memories 706, or between any two of the memories 706, etc. The local interface 709 may comprise additional systems designed to coordinate this communication, including, for example, performing load balancing. The processor 256 may be of electrical or of some other available construction.

Although the data transfer application 209 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowcharts of FIGS. 3-6 show the functionality and operation of an implementation of portions of the data transfer application 209. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 256 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data transfer application 209, that comprises software or code can be embodied in any non-transitory computer-readable medium for use by or in connection with an instruction execution system such as, for example, a processor 256 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the data transfer application 209, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 203, or in multiple computing devices in the same computing environment. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
a portable storage device comprising a processor and a memory; and
an application executable by the portable storage device, wherein the application, when executed, causes the portable storage device to at least:
  initialize the portable storage device upon receiving power from a first client device via a communication interface, wherein the first client device comprises at least one malicious file or an unverified configuration setting;
  determine that the portable storage device is in a write mode of operation;
  receive a data transfer request for a first file and a second file from the first client device;
  execute a data transfer operation by storing the first file and the second file from the first client device in memory associated with the portable storage device;
  determine that the second file does not comply with a policy based at least in part on an identification of malicious code in the second file that corresponds with a malicious code reference associated with the policy, wherein the second file is determined not to comply with the policy in an instance in which the data transfer operation has been initiated or completed;
  remove the second file from the memory associated with the portable storage device in response to determining that the second file does not comply with the policy;
  generate a digital signature for the first file based at least in part on a signature key, the digital signature including a policy version of the policy that validated the first file; and
  encrypt the first file and the digital signature associated with the first file.

2. The system of claim 1, wherein the write mode of operation is determined from a mode selector switch, the mode selector switch being configured to switch an operating mode of the portable storage device to at least one of a read mode of operation or an administrative mode of operation.

3. The system of claim 1, wherein the application, when executed, further causes the portable storage device to at least store a log of activity associated with a compliance processing workflow for the first file and the second file as file audit data.

4. A system, comprising:
a portable computing device comprising a processor and a memory; and
an application executable by the portable computing device, wherein the application, when executed, causes the portable computing device to at least:
  receive, via a first client device, a data transfer request for a first file and a second file;
  receive the first file and the second file from the first client device, wherein the first file and the second file are stored in the memory of the portable computing device;
  determine that the first file fails to comply with a security policy, wherein the first file is determined not to comply with the security policy in an instance in which the first file has been stored in the memory of the portable computing device;
  determine that the second file complies with the security policy;

perform a remedial action for the first file in response to the determination that the first file fails to comply with the security policy, the remedial action causing the first file to be inaccessible to a second client device through the portable computing device; and enable the second file to be accessible to the second client device, the portable computing device facilitating a transfer of the second file to the second client device.

5. The system of claim 4, wherein the remedial action comprises deleting the first file from the memory.

6. The system of claim 4, wherein the application, when executed, further causes the portable computing device to at least generate a digital signature for the second file, the digital signature indicating that the second file is compliant with the security policy.

7. The system of claim 6, wherein the application, when executed, further causes the portable computing device to at least encrypt the second file with an encryption key.

8. The system of claim 6, wherein the second file is made accessible to the second client device in response to generating the digital signature for the second file.

9. The system of claim 6, wherein the digital signature for the second file is associated with a policy version of the security policy, the policy version representing a version of the security policy that was used to validate a compliance of the second file.

10. The system of claim 4, wherein enabling the second file to be accessible to the second client device further comprises verifying that a compliance processing workflow for the first file and the second file is complete prior to enabling the second file to be accessible to the second client device.

11. The system of claim 4, further comprising a battery, wherein the battery provides power to the portable computing device at an instance in which the portable computing device loses power from a communication interface associated with the first client device or the second client device and the portable computing device has not finished completing a compliance processing workflow for the first file or the second file.

12. The system of claim 4, wherein the remedial action comprises moving the first file to a quarantined memory location of the memory that is inaccessible to the second client device in an instance in which the portable computing device is in a read mode of operation.

13. The system of claim 4, wherein performing the remedial action for the first file further comprises illuminating a light emitted diode (LED) of the portable computing device.

14. The system of claim 4, wherein the application, when executed, further causes the portable computing device to at least enable access to the first file for the second client device in response to verifying an authentication of the second client device.

15. The system of claim 4, wherein performing the remedial action on the first file further causes moving the first file to a quarantined memory location of the memory, wherein a policy version of the security policy is stored in association with the first file, the policy version representing a version of the security policy that was used to identify that the first file failed to comply with the security policy.

16. A method, comprising:
determining, via a portable computing device, that the portable computing device is in a write mode of operation;
receiving, via the portable computing device, a data transfer request for a file from a first client device;
transferring, via the portable computing device, the file from the first client device to memory associated with the portable computing device;
determining, via the portable computing device, that the file complies with a policy, wherein the file is determined to comply with the policy in an instance in which the file has been transferred to the memory associated with the portable computing device;
generating, via the portable computing device, a digital signature for the file, the digital signature indicates that the file is compliant with the policy; and
transferring, via the portable computing device, the file and the digital signature to a second client device, wherein the digital signature can be used to validate a compliance of the policy.

17. The method of claim 16, wherein the policy comprises a security policy that is used to identify at least one of a plurality of malicious indicators in file content or file attributes associated with the file.

18. The method of claim 16, further comprising presenting the portable computing device as a Universal Serial Bus (USB) mass storage device to the first client device.

19. The method of claim 16, wherein transferring the file and the digital signature to the second client device further comprises checking, via the portable computing device, that a compliance processing workflow for the file has been completed before allowing the portable computing device to transfer the file to the second client device.

20. The method of claim 16, wherein the write mode of operation is determined from user input provided by way of at least one of: a switch, a button, or a microphone associated with the portable computing device.

* * * * *